United States Patent [19]

Hopley et al.

[11] 4,432,422

[45] Feb. 21, 1984

[54] BOREHOLE GUIDE AND METHOD OF BORING INTERPENETRATING HOLES

[75] Inventors: Robert J. Hopley, Germiston; Wynand J. van der Westhuizen, Boksburg, both of South Africa

[73] Assignee: Boart International, Limited, Transvaal, South Africa

[21] Appl. No.: 283,276

[22] Filed: Jul. 14, 1981

[30] Foreign Application Priority Data

| Jul. 17, 1980 [ZA] | South Africa | 80/4310 |
| Sep. 9, 1980 [ZA] | South Africa | 80/5549 |
| Nov. 10, 1980 [ZA] | South Africa | 80/6920 |

[51] Int. Cl.³ ............................................. E21B 7/08
[52] U.S. Cl. ........................................ 175/61; 175/80; 175/326
[58] Field of Search ............... 175/325, 328, 79, 80, 175/81, 408, 53, 61, 62, 74

[56] References Cited

U.S. PATENT DOCUMENTS

| 2,026,062 | 12/1935 | Reilly | 175/326 |
| 2,042,447 | 5/1936 | Haskel | 175/326 |
| 2,308,067 | 1/1943 | Eickhoff | 175/326 |
| 2,386,514 | 10/1945 | Stokes | 175/81 |
| 3,397,746 | 8/1968 | Link | 175/81 |
| 4,189,183 | 2/1980 | Borowski | 175/50 |
| 4,258,800 | 3/1981 | Hipp | 175/74 |
| 4,285,399 | 8/1981 | Holland et al. | 166/113 |

FOREIGN PATENT DOCUMENTS

| 1345662 | of 1963 | France | 175/326 |
| 374451 | of 1970 | U.S.S.R. | 175/326 |
| 724719 | of 1978 | U.S.S.R. | 175/326 |

Primary Examiner—Stephen J. Novosad
Assistant Examiner—William P. Neuder
Attorney, Agent, or Firm—Lowe, King, Price & Becker

[57] ABSTRACT

A borehole guide for drilling interpenetrating boreholes which may be parallel to one another or inclined to one another. The borehole guide is clamped in position in an already drilled borehole by inflating an inflatable member. Thereafter a drill which is directed by the guide is used to drill a second borehole which overlaps the first hole. A number of the borehole guides may be used end to end, and their relative orientation may be varied to direct the second borehole, within limits, along a desired path.

18 Claims, 8 Drawing Figures

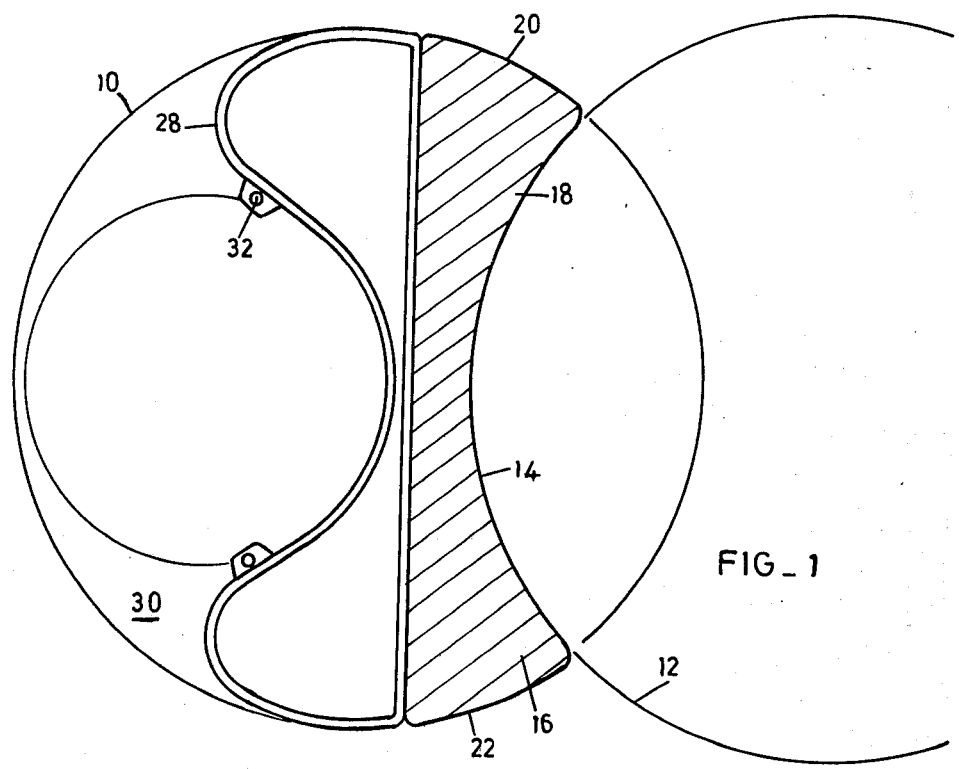
FIG_1
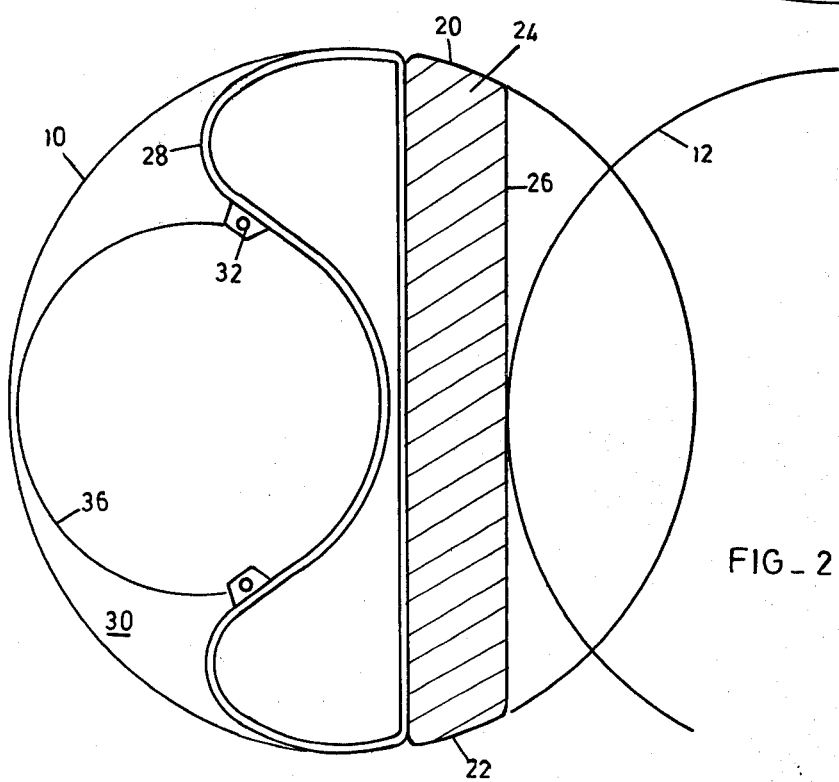
FIG_2

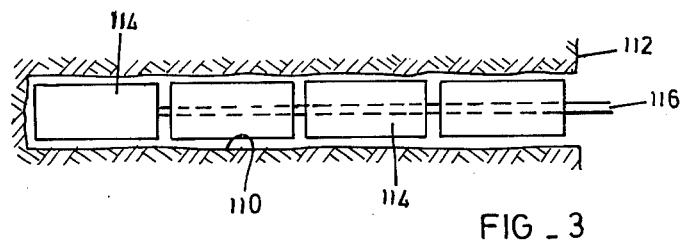
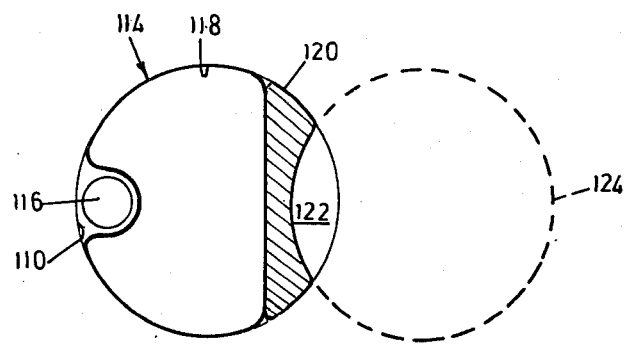
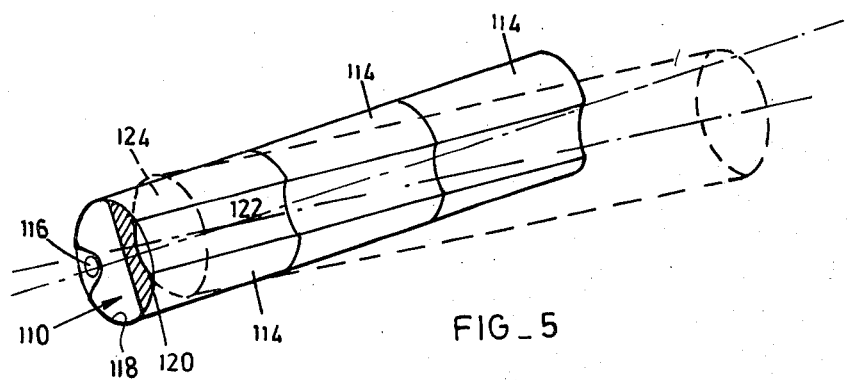

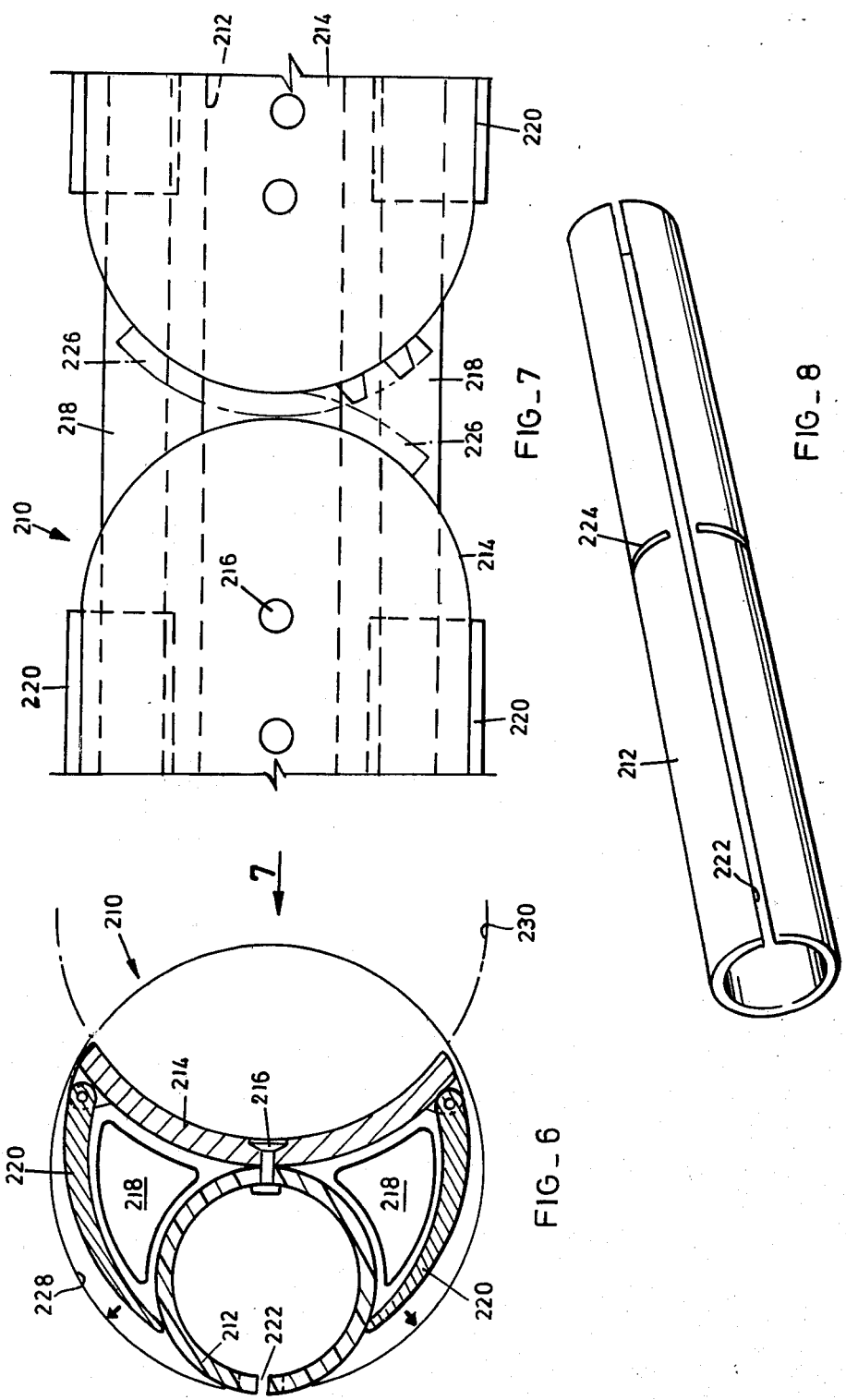

BOREHOLE GUIDE AND METHOD OF BORING INTERPENETRATING HOLES

BACKGROUND OF THE INVENTION

This invention relates to a borehole guide and to a method of boring interpenetrating holes.

In mining or excavating operations in general it is frequently necessary to bore adjacent overlapping holes. This may for example be the requirement where a narrow band of reef is to be extracted from the rock face. It is then essential to be able to drill successive holes accurately in the reef so as to recover the maximum amount of ore. Clearly where a hole is drilled overlapping an already drilled hole there is a tendency, which depends on the degree of overlap, for the later hole to run into the earlier one.

Various devices have been provided to maintain the drill on course, some exterior to the body being drilled, and some located within the preceding hole.

U.K. Pat. No. 865935 describes a tubular guide which is inserted into a first hole and which then forms a guide surface for a second overlapping hole. The device has a limited application in that it can be used only over lengths of up to 5 meters and in addition the overlapping holes are all parallel to one another. The problem exists with this type of device that when long holes i.e. of 20 meters or more are to be drilled it is physically very difficult to locate a guide of this length in a hole and moreover the frictional forces which are to be overcome in locating the guide and removing the guide from the hole are excessive.

German Pat. No. 377989 discloses a wedge shaped deflection piece which permits non-parallel overlapping holes to be drilled. The device is effective however only over a limited length.

Another type of borehole guide which is mentioned extensively in the literature in general makes use of a torpedo or other guide member which travels with the drill and alongside it in a hole which is already drilled. With this type of device long holes can be drilled but they are parallel to one another and no provision is made for the orientation of a second hole to be altered relatively to a first hole. Devices of the type in question are described for example in the specifications of U.K. Pat. No. 1456937, German Pat. Nos. 255979 and 972350, and U.S. Pat. Nos. 2,236,399, 2,308,067, 2,368,511, 3,170,527, 3,874,463 and 3,805,899.

SUMMARY OF THE INVENTION

It is an object of the present invention to provide an improved method of boring interpenetrating holes.

The invention provides a method of boring interpenetrating holes which includes the steps of boring a first hole, locating at least one guide in the first hole, securing the guide in position by operating clamping means, and using the guide to direct a drill which bores a second hole overlapping the first hole.

The method of the invention may be used to drill parallel or non-parallel holes.

In accordance with a preferred form of the invention the guide is secured in position by inflating at least one inflatable member.

A plurality of the guides may be located in the first hole in end to end relationship and may be secured in position angularly displaced relatively to one another. Within limits this has the effect of causing the second hole to be non-parallel to the first hole. The guides may be adjusted so that the second hole rotates in either direction at a suitable angular rate of turn relatively to the first hole. Effectively therefore the guide area follows a helical path which may be in either sense of rotation. On the other hand it is possible to arrange the guides so that the second hole interpenetrates the first hole over a limited distance only and thereafter passes into solid rock i.e. without overlapping the first hole.

The invention also provides a borehole guide which comprises at least one guide member and clamping means for securing the guide in position in a borehole.

The clamping means may take any suitable form, the essence of the invention in this respect being that the guide member is easily located in position and is thereafter secured in position by operating the clamping means. Thus the need for frictional contact of the guide member with the wall of the borehole, as for example is the case in U.K. Patent Specification No. 865935, is avoided.

Preferably the clamping means includes at least one inflatable member. The member may be inflated by means of gas such as compressed air or liquid such as water.

Further according to the invention the guide member is secured to the inflatable member.

The inflatable member, when inflated, may itself engage the wall of the borehole or alternatively or additionally the bore hole guide may include at least one shoe which is moved into engagement with the wall of the borehole when the inflatable member is inflated.

The shoe may be pivotally fixed to the guide member and may include means to bias the shoe against the action of the inflatable member.

The guide member may have any suitable guide surface e.g. an arcuate guide surface or a substantially planar guide surface.

The borehole guide may include a plurality of the guide members arranged end to end and coupled to one another by means which permits orientation of the guide members relatively to one another.

Alternatively a plurality of the guide members may be secured to elongate interconnection means along its length. The interconnection means is then adjustable to permit orientation of the guide members relatively to one another. The interconnection means may comprise an elongate flexible spine and the spine may be substantially cylindrical with a plurality of apertures formed through its wall.

The apertures may comprise one or more longitudinally extending slits and a plurality of transverse slits. The apertures increase the flexibility of the spine by permitting it to deform.

Where use is made of a plurality of guide members in this way they are preferably independently adjustable, at least to a limited extent, relatively to one another. Thus they may be angularly displaceable to one another with reference to the center line of the bore hole or displaceable towards or away from the center line.

The interconnected or interengaged guides may be used in any order convenient to ensure that the new hole being drilled remains on a desired path. The interconnection means may serve to align the guides and where the guides are inflatable may simultaneously serve as a means for introducing pressure fluid into the guides, and for exhausting pressure fluid from the guides.

BRIEF DESCRIPTION OF THE DRAWINGS

The invention is further described by way of examples with reference to the accompanying drawings in which:

FIG. 1 and FIG. 2 respectively illustrate in section two embodiments of a borehole guide according to the invention, FIG. 3 is a schematic side view of a hole bored in a rock face and fitted with guides according to the invention, FIG. 4 is an enlarged view of the mouth of the hole of FIG. 3, FIG. 5 is a perspective view of a borehole fitted with guides according to a variation of the invention, FIG. 6 is a sectioned transverse view of another form of borehole guide according to the invention, FIG. 7 is a fragmentary side view of the guide of FIG. 6, in the direction of an arrow "7", and FIG. 8 is a view in perspective of a spine used in the guide of FIG. 6.

DESCRIPTION OF PREFERRED EMBODIMENTS

FIGS. 1 and 2 illustrate a hole 10 that has been drilled and a hole 12 that is to be drilled, interpenetrating the hole 10. An arc 14 represents the overlap between the two holes.

In the embodiment illustrated in FIG. 1 the borehole guide consists of a profiled guide member 16 which has a concave face 18 matched to the arc 14 and two wings 20 and 22 respectively which have radii of curvature which are the same as the radius of the hole 10.

In the borehole guide shown in FIG. 2 use is made of a guide member 24 which has a flat face 26 and wings 20 and 22 similar to those illustrated in FIG. 1.

In each embodiment the guide member is secured to an inflatable member 28. The member 28 may for example be made of rubber or a rubber-like material. Each guide member is secured to the outer surface of the inflatable member 28.

In each case the borehole guide is inserted into the hole 10 in the deflated state. The guide face of the guide member is directed towards the axis of the hole 12 which is to be drilled and thereafter the inflatable member 28 is inflated by means which is provided at the mouth of the hole 10. In the FIG. 1 embodiment the concave face 18 is coincident with the arc 14 so that it completes the circumference of the circle 12. In the FIG. 2 embodiment the face 26 is tangential to the circle 12.

The surface 18 provides an adequate guide for the drill which is used to form the hole 12 but it is at its most effective only when used with a particular sized drill. On the other hand the flat face 26 of the FIG. 2 embodiment can be used with drills of any diameter but it provides a guiding action in one direction only. Both of the guides are effective at preventing the second hole from running into the first hole. It should be mentioned that the arcuate guide surface 18 need not be parallel to the axis of the hole 10 and could for example be inclined relatively to the axis.

The medium used to inflate the member 28 may be compressed air but it is preferred that use is made of water. The function of the member 28, when inflated, is to hold the guide face against the drill while it itself engages the wall of the borehole. Since air is compressible it must be at a high pressure if the member 28 is to resist displacement by the drill. Water on the other hand is incompressible and does not need pressurising. If necessary means may be provided to stiffen or buttress the inflated member 28, the means being retractable to enable the guide to enter, or to be withdrawn from, the borehole.

FIGS. 1 and 2 show the member 28 in the deflated condition but evidently when the member is inflated it comes into intimate contact with the wall of the hole 10. When the member is deflated a gap 30 is formed between the member and the wall of the hole. This gap may be used to house a sensor, such as a conventional borehole periscope, indicated schematically by a circle 36 which for example is used to monitor the characteristics of reef which is being extracted by the boring process. Lugs 32 may be provided on the member 28 to mount the sensor 36. In use, before inflation of the member 28, the sensor 36 is withdrawn from the borehole.

One of the virtues of the guide of the invention is that, in the deflated condition, it can readily be inserted into the borehole, and withdrawn from it. It is also easy to orientate the guide face 18 or 26 within the hole. A further virtue is that the guide is light in weight and so is easy to handle.

FIGS. 3 and 4 illustrate an extension of the inventive concept described thusfar. These figures show a hole 110 bored in a rock face 112. A plurality of end to end guides 114 supported on a pipe insertion and orientation tool 116 are inserted into the hole.

Each guide includes an inflatable bag 118 and a profiled guide member 120 secured to the outer surface of the bag. The bag is fixed to the pipe at a number of locations by any suitable means so that the pipe correctly orientates the bag.

Initially the bags are deflated. However once in position in the hole they are inflated by any suitable medium, e.g. water, which is introduced into the bags. When the bags are inflated the guide members 120 are aligned with one another in a predetermined arrangement and are firmly located in position in the hole thus forming a guide area 122 which is in effect the common area of the hole 110 and a second overlapping hole 124, shown in dotted outline, which is subsequently bored, in the manner described, by means of a drill directed along a desired path by means of the guide surfaces of the members 120.

The guide areas 122 may be arranged parallel to the longitudinal axis of the first hole so that the second hole is formed parallel to the first hole. Alternatively the guides may be of the type such that the guide areas 122 are angularly displaced along their lengths substantially as shown in FIG. 5. The guide areas 122 thus form an inclined path which permits the second hole 124 to be drilled overlapping the first but not parallel to it. The orientation and degree of angular displacement of the guides are for example determined with the aid of a suitable sensor to ensure that the maximum amount of reef is extracted from each successive hole.

It may be mentioned at this point that the guide members 120 are secured to the outer surface of the bag 118 and consequently the bag is not directly exposed to the drill when an adjacent hole is formed. This minimises the possibility of the bag being damaged by the drill.

FIGS. 6 to 8 illustrate another embodiment of a borehole 210 formed according to the invention which includes a longitudinally extending spine 212, a plurality of end to end guide members 214 with arcuate guide surfaces fixed to the spine by means of rivets 216, two longitudinal extending inflatable members 218, and shoes 220 fixed to the guide members 216. The spine 212 is made from a plastics material and, as shown in FIG. 8, is substantially tubular with a longitudinally extending slit 222. The spine is segmented by means of transverse slits 224 which are practically circumferential.

Each segment of the spine has one guide member 214 fixed to it and each guide member has two of the shoes 220 pivotally fixed to it. The shoes are inwardly biased i.e. toward the inflatable members, by means of springs, not shown.

Adjacent guide members 214 are articulated by means of meshing teeth 226 located at their extremities in the longitudinal direction.

The guide is used in a manner analogous to that already described in that, with the members 218 in a deflated state, the guide is inserted into a first hole 228 to form a guide surface for the drilling of a second contiguous hole 230.

The spine 212 is flexible, partly because of the slits which effectively define hinged connections between the segments, and so the spine can follow, and align the guide members inside, the hole 228 if it should be non-straight. In this respect the meshed interconnection of the guide members offered by the teeth 226 assists in aligning the guide members relatively to each other.

Once the borehole guide 210 is correctly located inside the hole 228 the members 218 are inflated. The shoes 220 are thereby forced outwardly, against the action of the springs, into contact with the wall of the hole 228, and the guide is clamped in position.

The second hole 230 can then be drilled with the arcuate surfaces of the guide members 214 acting as a guide for the drill, in the manner already described. After the hole 230 is drilled the members 218 are deflated and the shoes then release automatically under the action of the springs thereby permitting the borehole guide to be retracted from the hole 228.

The articulated borehole guides of the invention are lightweight and of minimum size and so can be used in long holes of 20 meters or more. The segmented guides can be so orientated that each successive hole is drilled with optimum efficiency for maximum reef recovery, or for any other purpose. The holes are then overlapped in a desired configuration without the danger of the holes running into each other.

We claim:

1. A method of boring interpenetrating non-parallel holes which includes the steps of boring a first hole, locating at least two guides in the first hole with one of the guides being angularly displaced relative to the other guide to form an inclined path that can be varied in degree of inclination, securing each guide in position by displacing each guide into contact with a wall of the first hole such that substantially an entire surface of the guide travels approximately the same distance to contact the wall, and directing a drill into guiding engagement with the guides to bore a second hole overlapping the first hole.

2. A method according to claim 1 wherein said guides are secured in position by inflating at least one inflatable member.

3. A method according to claim 1 wherein said guides are located in the first hole in end to end relationship.

4. A borehole guide which comprises a plurality of guide members for receiving a drill in guiding engagement therewith to guide said drill to bore a second borehole overlapping a first borehole; elongate interconnection means to which the guide members are secured along the length of the interconnection means, the interconnection means being flexible to permit orientation of the guide members relative to one another and clamping means for securing the guide members in position in the first borehole, said clamping means including means for displacing each guide member into contact with a wall of the first borehole such that substantially an entire surface of the guide travels approximately the same distance to contact the wall.

5. A borehole guide according to claim 4 wherein the clamping means includes at least one inflatable member.

6. A borehole guide according to claim 5 wherein the guide members are secured to the inflatable member.

7. A borehole guide according to claim 5 wherein the inflatable member, when inflated, engages the wall of the borehole.

8. A borehole guide according to claim 5 which includes at least one shoe which is moved into engagement with the wall of the borehole when the inflatable member is inflated.

9. A borehole guide according to claim 8 wherein the shoe is pivotally fixed to the guide members.

10. A borehole guide according to claim 8 with means to bias the shoe against the action of the inflatable member.

11. A borehole guide according to claim 4 wherein each guide member has an arcuate guide surface.

12. A borehole guide according to claim 4 wherein each guide member has a substantially planar guide surface.

13. A borehole guide according to claim 7 wherein the interconnection means comprises an elongate flexible spine.

14. A borehole guide according to claim 13 wherein the spine is substantially cylindrical and includes a plurality of apertures through its wall which increase its flexibility.

15. A borehole guide which comprises a plurality of guide members arranged end to end and coupled to one another by coupling means for permitting orientation of the guide members relative to one another; each guide member further being angularly displaceable with respect to the longitudinal axis of the first borehole, each guide member being adapted to receive and guide a drill to bore a second borehole overlapping a first borehole in which the guide members are located and clamping means for securing the guide members in a position within the first borehole, said clamping means including means for displacing each guide member into contact with a wall of the first borehole such that substantially an entire surface of the guide travels approximately the same distance to contact the wall.

16. A borehole guide according to claim 4 wherein the guide members are angularly displaceable relative to one another.

17. A borehole guide of claim 15, wherein said coupling means includes flexible means and facing ends of adjacent guide members having meshing teeth to permit articulation of said guide members.

18. A borehole guide which comprises at least one guide member for receiving and guiding a drill to bore a second borehole overlapping a first borehole, clamping means for securing the guide in a position in the first borehole, said clamping means including means for displacing the guide into contact with a wall of the first borehole such that substantially an entire surface of the guide travels approximately the same distance to contact the wall, and means for locating a sensor inside at least one of the boreholes.

* * * * *